(12) United States Patent
Simeray et al.

(10) Patent No.: US 6,279,470 B2
(45) Date of Patent: Aug. 28, 2001

(54) PORTABLE AND SELF-CONTAINED SYSTEM FOR MAINTAINING PREPARED MEALS IN A COOL STATE AND REHEATING THEM

(75) Inventors: Janick Simeray, Colombes; Pierre Le Blevennec, Boulogne-Billancourt; Pascal Laligant, Le Plessis Belleville, all of (FR)

(73) Assignee: Biontronics S.A. (FR)

( * ) Notice: Subject to any disclaimer, the term of this patent is extended or adjusted under 35 U.S.C. 154(b) by 0 days.

(21) Appl. No.: 09/729,001

(22) Filed: Dec. 4, 2000

Related U.S. Application Data

(63) Continuation of application No. PCT/FR99/01311, filed on Jun. 3, 1999.

(30) Foreign Application Priority Data

Jun. 4, 1998 (FR) ................................................ 98 07034

(51) Int. Cl.$^7$ ............................ A47J 39/00; A47J 39/02; A47B 31/02; H05B 5/08; H05B 6/02

(52) U.S. Cl. ................................ 99/470; 99/448; 99/451; 99/468; 99/483; 62/3.3; 62/246; 62/457.6; 165/48.1; 165/902; 165/918; 219/386; 219/621

(58) Field of Search ............................ 99/330–333, 340, 99/342, 447, 448, 451, 467, 468, 470, 483, DIG. 14; 62/3.3, 3.61, 246, 400, 430, 434, 457.2, 456.6; 126/261, 246, 375; 165/48.1, 902, 918, 919, 61, 63, 64, 267, 201; 219/386, 387, 620–622, 506, 624, 626, 649, 521, 660, 671, 725, 753, 675, 676; 392/449, 459; 426/231, 237, 243, 244; 374/141, 149, 150; 312/236

(56) References Cited

U.S. PATENT DOCUMENTS

| | | |
|---|---|---|
| 3,408,481 | 10/1968 | Golden . |
| 4,020,310 * | 4/1977 | Souder, Jr. et al. ................. 219/621 |
| 4,110,587 * | 8/1978 | Souder, Jr. et al. ................. 219/622 |
| 4,182,405 | 1/1980 | Hysen et al. . |
| 5,086,834 * | 2/1992 | Grandi ................................. 165/48.1 |
| 5,182,438 * | 1/1993 | Oakes et al. ......................... 219/386 |
| 5,245,150 * | 9/1993 | Grandi ................................. 165/61 X |
| 5,273,360 * | 12/1993 | Wyatt et al. ........................... 99/448 |
| 5,285,051 * | 2/1994 | DeGrow et al. .................. 165/919 X |
| 5,403,997 * | 4/1995 | DeGrow et al. ...................... 165/919 |
| 5,424,427 * | 6/1995 | Lee ..................................... 219/665 X |
| 5,466,915 * | 11/1995 | Meier et al. ........................ 99/451 X |
| 5,505,122 * | 4/1996 | Gerrit ................................. 99/483 X |
| 5,603,858 * | 2/1997 | Wyat et al. ...................... 99/DIG. 14 |
| 5,628,241 * | 5/1997 | Chavanaz et al. ................. 99/483 X |

FOREIGN PATENT DOCUMENTS

| | | |
|---|---|---|
| 0 818 169 A3 | 1/1998 | (DE) . |
| 2 756 448 | 5/1998 | (FR) . |

* cited by examiner

Primary Examiner—Timothy F. Simone
(74) Attorney, Agent, or Firm—Schnader Harrison Segal & Lewis LLP

(57) ABSTRACT

A food heating and cooling device including a tray, at least one main dish plate in the tray, at least one secondary dish plate in the tray, a cover associated with the tray for maintaining the food hot or cold, an inducer for heating, reheating or maintaining heat and powered by an electronic generator circuit which induces currents in an armature located on or under the plates, a thermoelectric exchanger for maintaining the food cold or cool by extracting residual heat from the plates and compensates for thermal insulation leaks from the tray and cover, and rechargeable batteries connected to the inducer and the thermoelectric exchanger.

22 Claims, 3 Drawing Sheets

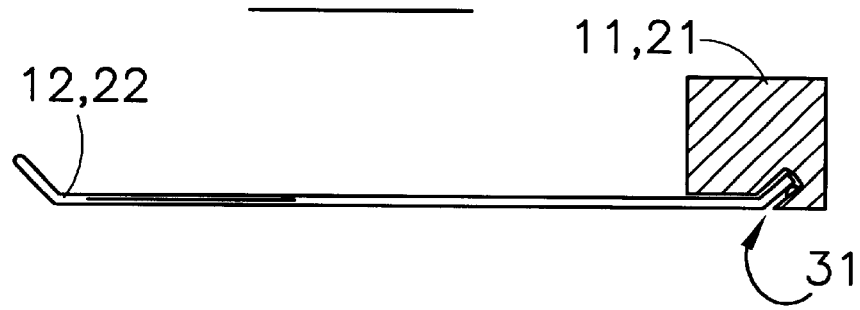
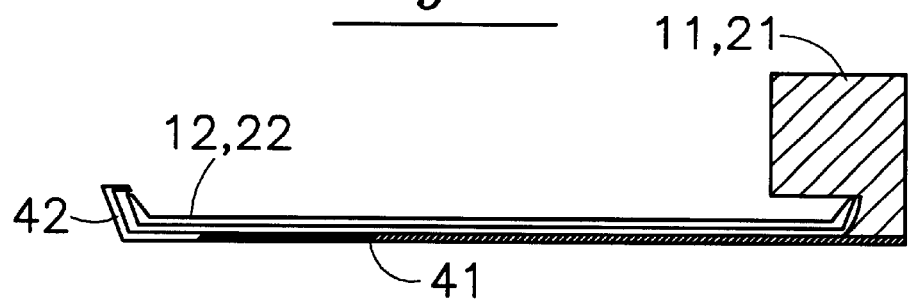
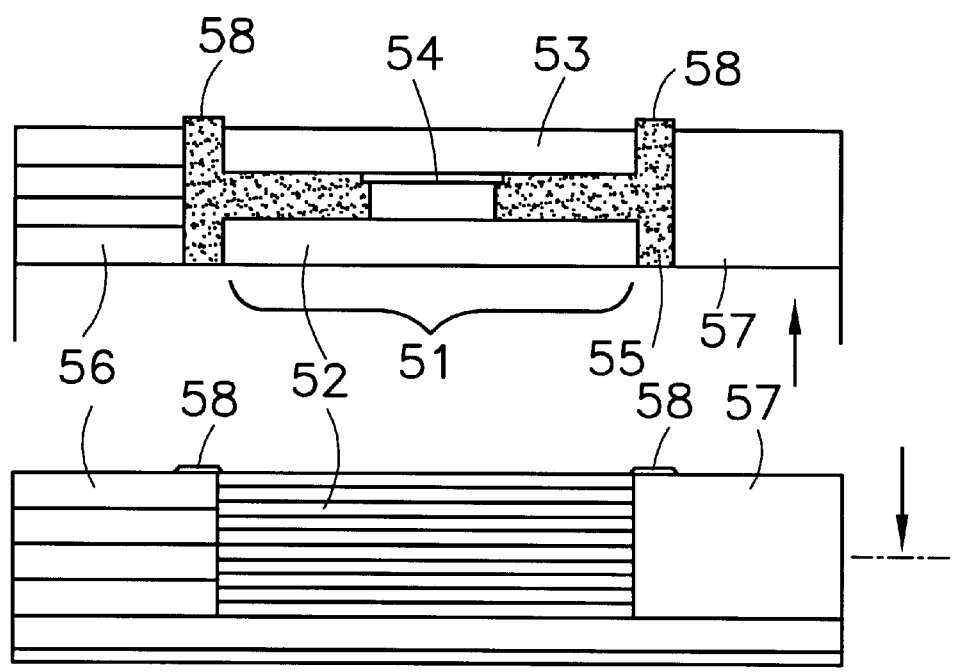

PORTABLE AND SELF-CONTAINED SYSTEM FOR MAINTAINING PREPARED MEALS IN A COOL STATE AND REHEATING THEM

RELATED APPLICATION

This is a continuation of International Application No. PCT/FR99/01311, with an international filing date of Jun. 3, 1999, which is based on French Patent Application No. 98/07034, filed Jun. 4, 1998.

FIELD OF THE INVENTION

This invention concerns a system for maintaining the temperature of prepared meals served on trays. More precisely, the system is portable and self-contained; ensures continuity of the cold chain for dishes that are consumed in the cool state during storage and transport; ensures continuity of the hot chain for dishes that are consumed in the hot state and carried out directly from the kitchen; reheats a dish that has been transported in the cold state just before its delivery and keeps the dish hot during its consumption. This system responds to the needs of the catering business as well as those of restaurants that provide meals for pick up or delivery.

BACKGROUND

Health regulations often require:

maintenance of cold conditions under 3° C. for long-term storage, and a cool temperature below 12° C. for delivery two hours prior to consumption.

Health regulations also often apply to hot dishes:

a hot dish which is consumed in the hot state should not drop below 62.5° C. during the delivery phase. Maintenance of the hot state should not last more than two hours.

A hot dish which is transported in the cold state should:

be cooled in less than one hour, refrigerated and maintained under 3° C., and be reheated above 65° just before consumption.

A hot delivered dish should be consumed above 62.5° C. for the best gustatory enjoyment. Thus, there is a requirement for the ability to maintain the temperature of the delivered dish while awaiting its consumption. These temperatures correspond to French regulations and are cited as examples.

These requirements are demanding and complicate the organization of take-out restaurants by imposing:

a very brief elapsed time between making the hot dish and its consumption, or alternatively, transport of cold dishes in refrigerated vehicles which requires that delivery be made just prior to consumption, followed by reheating the dish back up to the required temperature on the consumer's premises assuming that an oven is available.

A self-contained, portable device that maintains dishes in the hot state or provides for their reheating by induction is disclosed and described in patent application FR 9614475 and patent application PCT FR 97/02125 by the same author. Plates heated by induction are described in design patent application FR 9706059 and patent application FR 9802066 by the same author, as well as examples of inductors. In addition, U.S. Pat. No. 3,408,481 describes portable devices for service using the Peltier phenomenon and patent application EP 0 818 169 describes meal trays with induction.

The present invention describes a more complete, improved version of the previously described devices intended for the applications cited in the introduction.

SUMMARY OF THE INVENTION

The invention relates to a food heating and cooling device including a tray, at least one main dish plate in the tray, at least one secondary dish plate in the tray, a cover associated with the tray for maintaining the food hot or cold, an inducer for heating, reheating or maintaining heat which is powered by an electronic generator circuit, thereby inducing currents in an armature located on or under the plates, a thermoelectric exchanger for maintaining the food cold or cool by extracting residual heat from the plates and compensates for thermal insulation leaks from the tray and cover, and rechargeable batteries connected to the inducer and the thermoelectric exchanger.

BRIEF DESCRIPTION OF THE DRAWINGS

FIG. 3 shows a partial cross-section of a device of the invention with an integrated inductive circuit.

FIG. 4 shows a partial cross-section of a device of the invention with an integrated inductive circuit.

FIG. 5 shows interior views of the system of the invention.

DETAILED DESCRIPTION OF THE INVENTION

Figure 1:
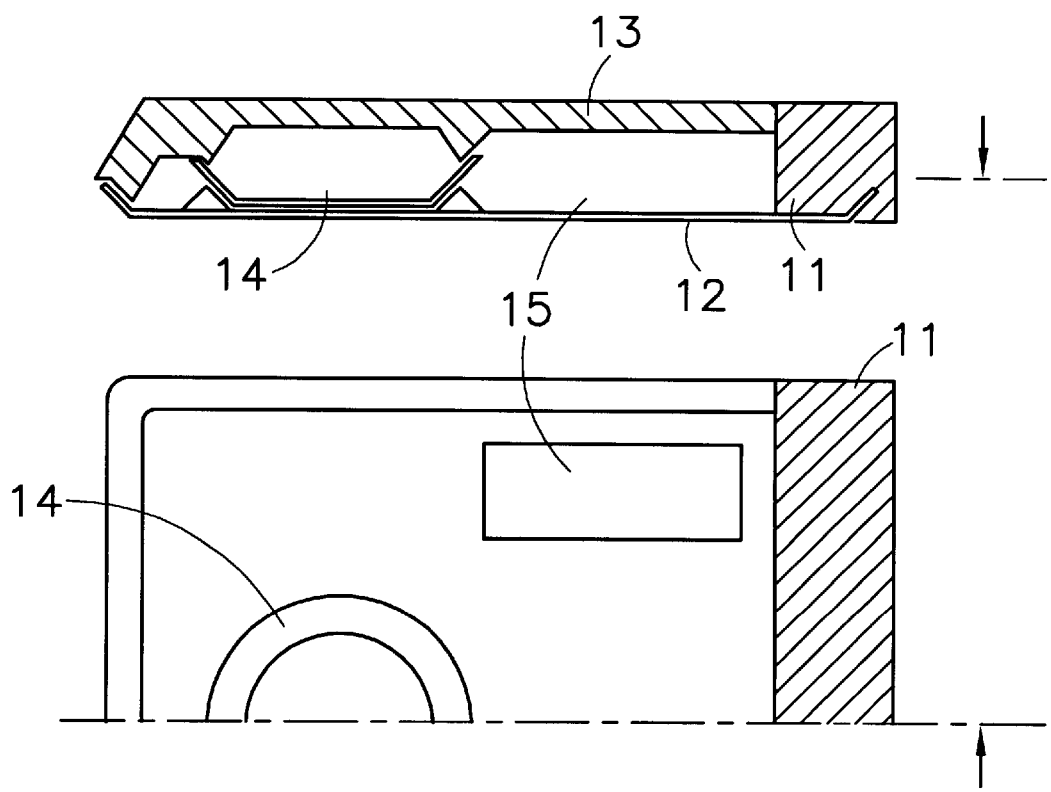
FIG. 1 shows a partial top view and a cross-section of a portion of the system in accordance with aspects of the invention.

The following description is intended to refer to specific embodiments of the invention illustrated in the drawings and is not intended to define or limit the invention, other than in the appended claims. Also, the drawings are not to scale and various dimensions and proportions are contemplated.

The device provides for the maintenance of sanitary temperatures, reheating the hot dish and maintenance of the dish in the hot state during its consumption. Thus, it simplifies logistics by reducing delivery and timing restrictions, and improves the consumer's enjoyment and satisfaction.

According to the invention, heating and cooling of the device is provided by electric means. The device is portable and contains a tray and its cover. The device is electrically self-contained, for example, by means of internal batteries. The device is rechargeable, comprises a safe low voltage input and/or a mains input.

The device has a tray on which are arranged hot or cold dishes, and optionally a hermetic cover that separates cold dishes from hot dishes by a partition. The tray and cover associated with the device thermally insulate and protect the meal. The device maintains the contents in a cold state by means of a thermoelectric process employing modules based on the Peltier effect. The thermoelectric cooling maintains the temperature of the cold cell at the required temperature, compensating for losses via the cover, the tray and the separating partition.

Dishes to be consumed in the hot state are maintained in the hot state or reheated by an inductive process.

The dishes to be consumed in the hot state are thus served on plates containing an armature and the device provides induction under the plate.

Turning now to the drawings in general and FIG. 1 in particular, there is shown an example of a layout of the elements associated with a device 11, a tray 12, a removable cover 13, a principal plate for hot dishes 14 and various appetizer plates, place settings and beverages 15.

Figure 2:
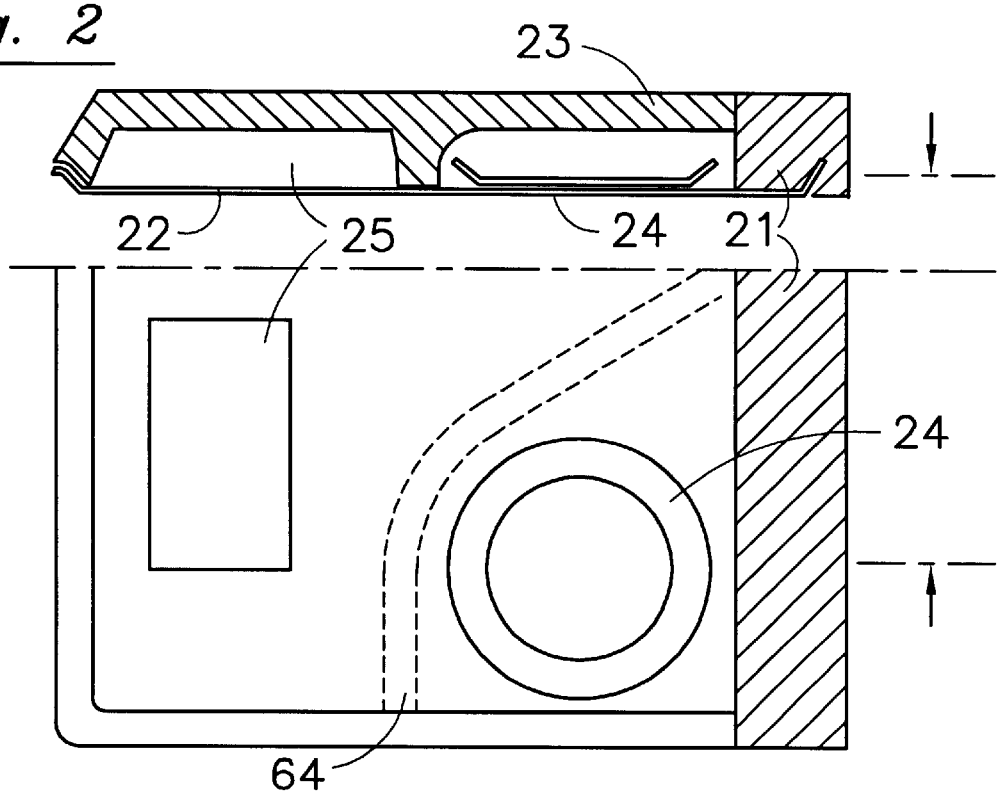
FIG. 2 shows a partial top view and a cross-section of another portion of the system in accordance with aspects of the invention.

FIG. 2 shows another example of layout of the device 21, tray 22, cover 23, plate 24 and appetizer plates 25.

FIG. 3 shows an example of implementation of the device associated with a tray 12 or 22 comprising an integrated inductive circuit and a removable connection 31 with said device 11 or 21.

FIG. 4 shows another example of implementation of the device 11 or 21 which is integral with an inductive support 41 on which rests a tray 12 or 22 without an inducer, which tray is locked in place by a locking system 42.

FIG. 5 shows the internal structure of the device 11 comprising a thermoelectric exchanger 51 constituted by an interior radiator 52, an exterior radiator 53, an internal thermal drain associated with a thermoelectric module 54, an insulating padding 55, an assembly of rechargeable batteries 56, an electronics unit 57 providing for the following functions: generation of induction, operation and control of the induction, management of the Peltier modules, temperature acquisition and thermostat, low-voltage recharging of the batteries, conversion of the mains voltage, control interface and possibly display. The device comprises a low-voltage connector and low-voltage support contact plugs 58, a mains box.

Figure 6:
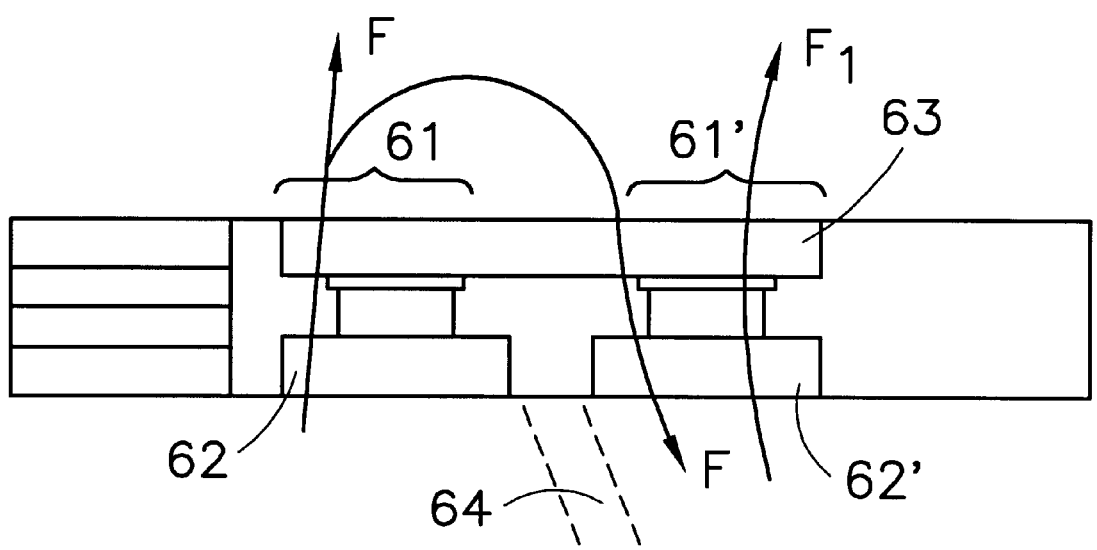
FIG. 6 shows another interior view of the system of the invention.

FIG. 6 presents details on the implementation of the device 21. The two heat exchangers 61 and 61', the internal radiators 62 and 62', the single exterior radiator 63, and the thermal flux F extracted from a cold zone, the thermal flux $F_1$ or F associated with the reheating zone, the separating partition 64 of the cover 23 (FIG. 2).

The device maintains the main course, dessert and appetizer in the cold state; then, approximately 20 minutes before the meal is to be consumed, implements reheating of the main course while still maintaining the appetizer and dessert in the cool state and, then, the maintenance of the main course in the hot state during the consumption of the appetizer and of the main course itself.

The first mode of implementation shown in FIG. 1 has the zone intended for the plate 14 facing the consumer circumscribed by a partition of the removable cover 13 which functions as a bell cover. The zone has an inducer in the tray 12 or in the tray support.

The bottom of the plate 14 has an armature located on or under the bottom facing said inducer.

The zone surrounding the plate contains the appetizer and dessert plates as well as the various accessories 15: beverage, place settings, bread, condiments, napkin, etc., as well as the device 11.

The cold state is maintained in the absence of inductive heating in the plate zone 14 by a permanent extraction of the residual heat from the main course and the appetizers, desserts and accessories, as well as the heat introduced by insulation leaks via the tray 12, the cover 13 and the joint between them. This heat is pumped by 11 and evacuated to the exterior.

A thermal connection links the plate zone 14 to the appetizer and dessert zone.

This heat conduit is represented by the sloped edges of the plate 14, which are left exposed and not made tight.

Ideally the temperature is maintained cold and thermostated as long as the device 11 pumps heat and compensates for the losses, and the induction heating device of the plate 14 does not operate.

The tray 12 and the cover 13 are made of insulating materials to reduce residual or standby losses. The joint between the cover and the tray is fitted to reduce leaks of heat and air with the exterior and control exchanges between the two internal zones.

On command, the device 11 generates an induction under plate 14. The plate 14, which is equipped with an armature, then heats up until the food reaches a desired hot temperature in, for example, 20 minutes. This heat is confined in the plate zone by insulation and the joints between the cover 13 and the tray 12 which limit heat leaks with the exterior. At the same time, the device 11 continues to extract and pump the heat from the zone of the appetizers and desserts 15 to the exterior. The thermal connection reheats the appetizers and desserts up to their cool consumption temperature. Thus, the appetizers and desserts are served in the cool state.

When the hot main course has reached the consumption temperature, the consumer is notified and may then eat the cool appetizer after having removed the cover. During this time, the main course is kept hot by heat supplied by the inducer. The main course is then kept hot during the entire duration of its consumption.

The second mode of implementation as shown in FIG. 2 has a plate zone 24 close to the device 21. The tray 22 has two induction zones, one corresponding to the zone 24 and the other facing the consumer. The cover 23 has an internal partition that circumscribes the plate zone 24.

In this second mode of implementation, maintenance of the cold state is implemented in the same manner in the plate zone and in the appetizer plate zone 25 by an extraction of the residual heat by pumping through 21.

The device 21 thus comprises two heat pumping devices that function thermally in parallel, with one device extracting the heat from the plate zone 24 and the other extracting the heat from the appetizer plate zone. The heat extracted from these two zones is evacuated onto a common sink on the exterior side of the device 21. The cover 23 and the tray 22 are thermally insulated and provided with a gasket which reduces the thermal leaks to the exterior and between the zones. There is no internal thermal connection between the two zones. Each zone is maintained at a temperature close to 0° C. and is independently thermostated.

Heating is implemented in a particular manner. The plate zone is heated by induction with an inducer placed under the plate which is in turn provided with an armature. In addition, upon start-up of the inductive heating, heat pumping of the plate zone is inverted and device 21 pumps heat from its exterior sink into plate zone 24. At the same time, device 21 continues to pump the heat from appetizer plate zone 25 to its exterior heat sink.

Thus, the exterior heat sink which is common to zones 24 and 25 of device 21 puts the two heat pumps in series with one heat pump extracting the heat from appetizer plate zone 25 and communicating it to the exterior sink, while the other heat pump takes up this heat from the exterior sink and transports it to zone 24. At the same time, common exterior sink 21 is brought to a temperature close to room temperature because all of the heat extracted from zone 25 is transported to zone 24.

Reheating the dish on plate 24 is thus a common and simultaneous action of an inducer that dissipates heat into the armature of plate 24 by direct thermal conduction and of pumping that sends heat from zone 25 into zone 24. This process of inductive heat combined with heat pumping is superior because it simultaneously reheats the food and air of zone 24, thereby reducing the evaporation from the food.

According to this second type of implementation, the maintenance of the cold state in the two zones is implemented at a conforming temperature. Reheating the food takes place, for example, in 20 minutes and brings the plate 24 and its contents to the consumption temperature. At the same time, the appetizer plates are maintained at a cool temperature which can be varied at will.

According to this second mode of implementation and by means of the presence of a second inducer facing the consumer, the hot main course can be maintained in the hot state in zone 24 while the appetizer is consumed in the zone facing the consumer, then the main course is kept hot while the consumer consumes it in the zone facing him.

It should be noted that the first as well as the second implementations both provide for a hot connection of the main course if necessary. Triggering heating is then actuated when the plate is placed in zone 14 or 24, depending on the mode.

Each of the two implementations of the device according to the invention can be the object of at least two modes of implementation in relation with many versions of associated accessories constituting the trays, plates and covers.

According to a first mode of implementation shown in FIG. 3, tray 12 or 22 contains the inductive circuits. Each tray has a conductor 31 for a removable electric connection with device 11 or 21, as well as a mechanical locking device enabling a rigid locking in place of the device on the side of said tray. According to this first mode of implementation, the tray has inductive circuits made, for example, on the basis of printed circuit technology in the form of an engraved copper deposit or a circuit that is attached and integrated in the mass of the composite. The removable electric connector is particularly robust and protected against oxidation so as to be resistant to frequent washings.

According to this first mode of implementation, the removable device allows the tray and the cover to be cleaned in a dishwasher while the surface of the device itself is cleaned under a stream of water with detergent at room temperature.

According to a second mode of implementation shown in FIG. 4, device 11 or 12 is integral with a support 41 on which rests tray 12 or 22. This support contains the inductors and is, for example, made of a conventional printed circuit on epoxy glass covered by protective insulating layers. The nonremovable electric connector between this support and the device is durable and protected; the mechanical structure is robust.

The removable tray is brought to be housed in a recess of the device. The tray is held in place by a locking device 42 that is integral with support 41 and which could be, for example, a spring leaf fastened in a recess of the tray present on the consumer side or a mushroom-shaped plug introduced into a cell of the tray.

In this second mode of implementation, the tray is of traditional fabrication and, thus, compatible without any special development with all of the requirements of resistance to washing, shock, detergent and to dishwasher temperature cycles. According to this second mode of implementation and according to the invention, the tray can be durable for multiple use or it can be designed for a single use and thus disposable. The same is true of the cover according to the first or second modes of implementation.

The tray fitted with a recess and cells, and its cover, one side of which allows attachment of device 11 or 21, are the associated accessories of the invention. According to the invention, the cover and tray are durable or designed for a single use. The tray or the cover can be separated from device 11 or 22. The cover can be provided with a folding flap to be able to insulate and protect the food. It can be folded over the opening intended for the exchanger.

According to the invention, this cover is suitable for delivering meals without making the device available to the consumer. The delivery agent would leave with the device while the cover would maintain the temperature of the dishes by limiting the internal and external thermal exchanges.

Finally, and according to a fabrication technique that has been especially optimized for reduced costs, it is possible to provide a single use, disposable tray for a modest manufacturing cost based on a tray to which is added an adhesive aluminum or copper inducer, the possible lines of which are attached. Such a single-use tray is suitable for the first mode of implementation according to FIG. 3.

In addition and according to the invention, according to one or the other of the previously cited two modes of implementations, the tray has projections or plugs or colored markers delimiting the position of the plate. Thus, the zones corresponding to the modes of implementation of FIG. 1 or FIG. 2 would be clearly and conveniently delimited.

Finally, the plates intended to be heated, reheated or kept hot by induction have an armature according, for example, to the patent applications by the same author cited in the introduction.

According to the invention, the plates are, without preference and as a function of the applications, of the disposable or durable type made of plastic, vitreous ceramic, porcelain or other material.

The device 11 may be constituted by elements assembled as shown, for example, in FIG. 5. The active central zone comprises a heat pump with air exchanger 51, constituted by a finned radiator on the exterior side 52 and the interior side 53, at least one heat drain in contact with a Peltier effect thermoelectric module 54 and one of the radiators. An insulating padding 55 confines the thermal flux through the module and limits the losses. According to the invention, the thermal flux is pumped by the thermoelectric module 54 under the effect of an electric voltage. The flux is absorbed by the internal radiator 53 and dissipates onto the external radiator 52. The arrow shows the direction of the heat extraction.

An assembly of rechargeable batteries 56 generates the feed voltage for self-contained use of the device 11, with these batteries powering the Peltier effect thermoelectric modules 54 and an electronics unit 57. The electronics unit, for example, comprises:

an induction generator circuit,
a control circuit for the Peltier modules,
a temperature acquisition and thermostat circuit,
a rapid battery recharge circuit,
a schedule programming microcontroller,
a control keyboard and a LCD or diode display, and
a 220 V voltage reducer.

It is convenient to stack the devices after use with or without the trays. Low voltage contact plugs 58 provide an electric connection from one device to another in the stack. These plugs carry the battery charging current into each device in the stack so as to implement an automatic collective charge. The first device is connected to the 220 V mains and used as a charger for the other devices or, alternatively, a contact connected to a low voltage power source carries the electricity. Each device possibly has a 220 V connection. It is understood, of course, that depending on the mode of implementation the generator card is in direct contact with the inducer or, alternatively, via a removable connector.

The device 21 according to the second implementation shown in FIG. 6 has the same elements with the exception of the heat pump which is split into two units 61 and 61', i.e., two internal radiators 62 and 62' and a single external radiator 63 and at least two Peltier effect thermoelectric modules. The flow of heat extracted from the appetizer plate zone 25 is represented by F and is in a constant direction. The flow of heat extracted from or carried to the plate zone 24 is represented by $F_1$ or F.

The internal partition 64 of the cover 23 provides for the insulation between the hot plate zone and the cold appetizer plate zone. In this implementation, the radiator 63 plays a double role, acting as an air sink of the fluxes F and $F_1$ as well as a thermal drain conductor of the flux F. Each heat exchanger comprising a radiator type sink can also have a microventilator or a microturbine. This contributes to the efficacy of the heat extraction and makes it possible to optimize the weight or the electrical self-containment of the device.

What is claimed is:

1. A food heating and cooling device comprising:
    a tray;
    at least one main dish plate in the tray;
    at least one secondary dish plate in the tray;
    a cover associated with the tray for maintaining said food hot or cold;
    an inducer for heating, reheating or maintaining heat and powered by an electronic generator circuit which induces currents in an armature located on or under said plates;
    a thermoelectric exchanger for maintaining the food cold or cool by extracting residual heat from said plates and compensates for thermal insulation leaks from said tray and cover; and
    rechargeable batteries connected to said inducer and said thermoelectric exchanger.

2. The device according to claim 1, wherein the heating, reheating or maintenance of a heated state of a main dish plate compartment is partially implemented by thermal pumping of heat extracted from a secondary dish plate compartment.

3. The device according to claim 1, wherein said inducer connects to an induction generator circuit by a removable connection.

4. The device according to claim 1, wherein the inducer is not an integral part of the tray and the tray rests on a support which is integral with the device and contains at least one inducer, and the tray is locked in place on said support by a lock.

5. The device according to claim 1, further comprising at least one Peltier effect thermoelectric module, at least one interior heat sink and at least one exterior heat sink.

6. The device according to claim 1, further comprising at least two internal radiators and an external heat sink, at least two Peltier effect thermoelectric modules and a separating wall.

7. A single-use, disposable tray or cover associated with the device according to claim 1, wherein the tray has an integrated inducer connected to a connector or a recess attachment system connected to an inducer support and the cover is fitted to the tray.

8. A multiple-use, durable tray or cover associated with the device according to claim 1, wherein the tray has an integrated inducer connected to a connector or a recess attachment system connected to an inducer support and the cover is fitted to the tray.

9. A cover according to claim 1, further comprising a folding flap for thermally insulating contents of the tray in the absence of the device.

10. A system for maintaining temperature of prepared meals comprising:
    a tray having a fitted cover, a first zone sized and shaped to receive a principal plate for hot food, at least a second zone sized and shaped to receive an appetizer or a dessert on appetizer plates and at least one Peltier effect module, wherein said Peltier effect module transfers heat between interior portions of the tray and the exterior of the tray,
    power-supply batteries associated with the tray enabling self-contained use;
    a circuit for controlling said Peltier effect modules; and
    an induction generator for maintaining the tray at a refrigerated temperature and selective heating of the first zone.

11. The system according to claim 10, characterized in that in the absence of inductive heating said Peltier effect module transfers heat from the interior of the tray to the exterior.

12. The system according to claim 10, wherein said plate has an armature.

13. The system according to claim 10, wherein a thermal connection links the first zone to the second zone, the thermal connection enabling reheating of the food in the second zone up to a cool consumption temperature when the inductive heating is turned on.

14. The system according to claim 13, wherein the thermal connection is formed by sloped edges of the plate which are left exposed and not made tight.

15. The system according to claim 10, further comprising at least one interior radiator and at least one exterior radiator.

16. The system according to claim 10, wherein said cover has an internal wall that separates the first zone from the second zone,
    and further comprises two Peltier effect modules which, in the absence of induction, transfer heat in parallel with one module transferring from the first zone to the exterior and the other from the second zone to the exterior, with the transfer of heat from the first zone being inverted when inductive heating is turned on.

17. The system according to claim 16, further comprising two internal radiators and one exterior radiator.

18. The system according to claim 10, wherein said first zone connects to the induction generator circuit by a removable connection.

19. The system according to claim 10, wherein said first zone is located on a support on which rests said tray without an inducer and which tray is locked in place by a lock.

20. The system according to claim 10, wherein said cover has at least one foldable flap.

21. The system according to claim 10, wherein said tray and said cover are reuseable.

22. The system according to claim 10, wherein said tray and said cover are disposable.

* * * * *